(12) United States Patent
Bracken et al.

(10) Patent No.: US 7,407,370 B2
(45) Date of Patent: Aug. 5, 2008

(54) AXIAL AND CIRCUMFERENTIAL SEAL FOR STACKED ROTOR AND/OR STATOR ASSEMBLY

(75) Inventors: Robert James Bracken, Niskayuna, NY (US); John Thomas Murphy, Niskayuna, NY (US); Stephen Swan, Clifton Park, NY (US); Jeffrey Robert Simkins, Rensselaer, NY (US); Clement Gazzillo, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 11/270,925

(22) Filed: Nov. 11, 2005

(65) Prior Publication Data

US 2007/0110567 A1    May 17, 2007

(51) Int. Cl.
*F01D 11/08*    (2006.01)

(52) U.S. Cl. .............. 415/199.5; 415/174.1; 416/244 A (58) Field of Classification Search .............. 415/174.1, 415/170.1, 199.4, 199.5, 216.1; 416/244 R, 416/244 A, 216, 218, 198 A, 201 R, 200 A
See application file for complete search history.

(56) References Cited

U.S. PATENT DOCUMENTS

| 2,637,521 | A | * | 5/1953 | Constantine et al. | .... 416/244 R |
| 4,208,165 | A | * | 6/1980 | Wikstrom | .................. 415/138 |
| 5,318,404 | A | | 6/1994 | Carreno et al. | ................. 416/96 |

* cited by examiner

*Primary Examiner*—Edward Look
*Assistant Examiner*—Dwayne J White
(74) *Attorney, Agent, or Firm*—Cantor Colburn LLP (57) ABSTRACT

Disclosed herein is a rotor assembly for a steam turbine including a stacked rotor section having rotor plates. The rotor plates include a main body portion having a plate shape and a first axial face and a second axial face opposite to the first axial face. The rotor plates also include an airfoil base surface at an outer radial edge of the main body portion. The rotor plates further include buckets which extend radially outward from the airfoil base surface. And the rotor plates yet further include a seal disposed to prevent steam exposure to the first and second axial faces.

20 Claims, 9 Drawing Sheets

AXIAL AND CIRCUMFERENTIAL SEAL FOR STACKED ROTOR AND/OR STATOR ASSEMBLY

BACKGROUND OF THE INVENTION

The present invention relates to axial and circumferential seals for a reaction steam turbine and, more particularly, to axial and circumferential seals between plates of a rotor and/or stator assembly of the reaction steam turbine.

Reaction steam turbines typically include multiple stator stages and corresponding rotor stages. Each of the stator stages is disposed proximate to the corresponding rotor stages to direct steam flow toward the rotor stages. The stator stages include nozzle stages that direct the steam flow. The rotor stages include buckets that receive the steam flow from the nozzle stages. The steam flow exerts a force upon the buckets of the rotor stages and causes rotation of a rotor assembly, which is converted to, for example, useful work or electrical energy.

Current integral-cover reaction nozzle stages include large quantities of individual reaction nozzles that are assembled into a machined stator inner casing using individual radial loading pins. Such a construction method increases time and cost of casting a stator assembly. Similarly, current integral-cover reaction bucket stages include large quantities of individual reaction buckets that are assembled into a machined rotor assembly using individual radial loading pins. Such a construction method increases time and cost of casting the machined rotor assembly.

To reduce time and cost of construction, individual plates may be fit together to form either a rotor or stator assembly. However, steam may leak between axial faces of the individual plates.

BRIEF DESCRIPTION OF THE INVENTION

Disclosed herein is a rotor assembly for a steam turbine including a stacked rotor section having rotor plates. The rotor plates include a main body portion having a plate shape and a first axial face and a second axial face opposite to the first axial face. The rotor plates also include an airfoil base surface at an outer radial edge of the main body portion. The rotor plates further include buckets which extend radially outward from the airfoil base surface. And the rotor plates yet further include a seal disposed to prevent steam exposure to the first and second axial faces.

Further disclosed herein is a stator assembly for a steam turbine including a stacked stator section having stator plates. The stator plates include a main body portion having a plate shape with a hollow center and a first axial face and a second axial face opposite to the first axial face. The stator plates also include an airfoil base surface near an inner radial edge of the main body portion. The stator plates further include nozzles which extend radially inward from the airfoil base surface. And the stator plates yet further include a seal disposed to prevent steam exposure to the first and second axial faces.

Yet further disclosed herein is a steam turbine including a stator assembly having stator plates. The stator plates include a stator main body portion having a plate shape and a first axial face and a second axial face opposite to the first axial face. The stator plates also include a stator airfoil base surface near an inner radial edge of the stator main body portion. Additionally, nozzles are included which direct steam flow and extend radially inward from the stator airfoil base surface. And, a stator plate seal is also disposed to prevent steam exposure to the first and second axial faces of the stator plates.

The steam turbine assembly also includes a rotor assembly having rotor plates. The rotor plates include a rotor main body portion having a plate shape and a first axial face and a second axial face opposite to the first axial face. The rotor plates also include a rotor airfoil base surface near an outer radial edge of the rotor main body portion. The rotor plates further include buckets which receive the steam flow and extend radially outward from the rotor airfoil base surface. The rotor plates yet further include a rotor plate seal disposed to prevent steam exposure to the first and second axial faces of the rotor plates.

The above, and other objects, features and advantages of the present invention will become apparent from the following description read in conjunction with the accompanying drawings, in which like reference numerals designate the same elements.

BRIEF DESCRIPTION OF THE DRAWINGS

Referring now to the drawings wherein like elements are numbered alike in the several FIGURES.

DETAILED DESCRIPTION OF THE INVENTION

Figure 1:
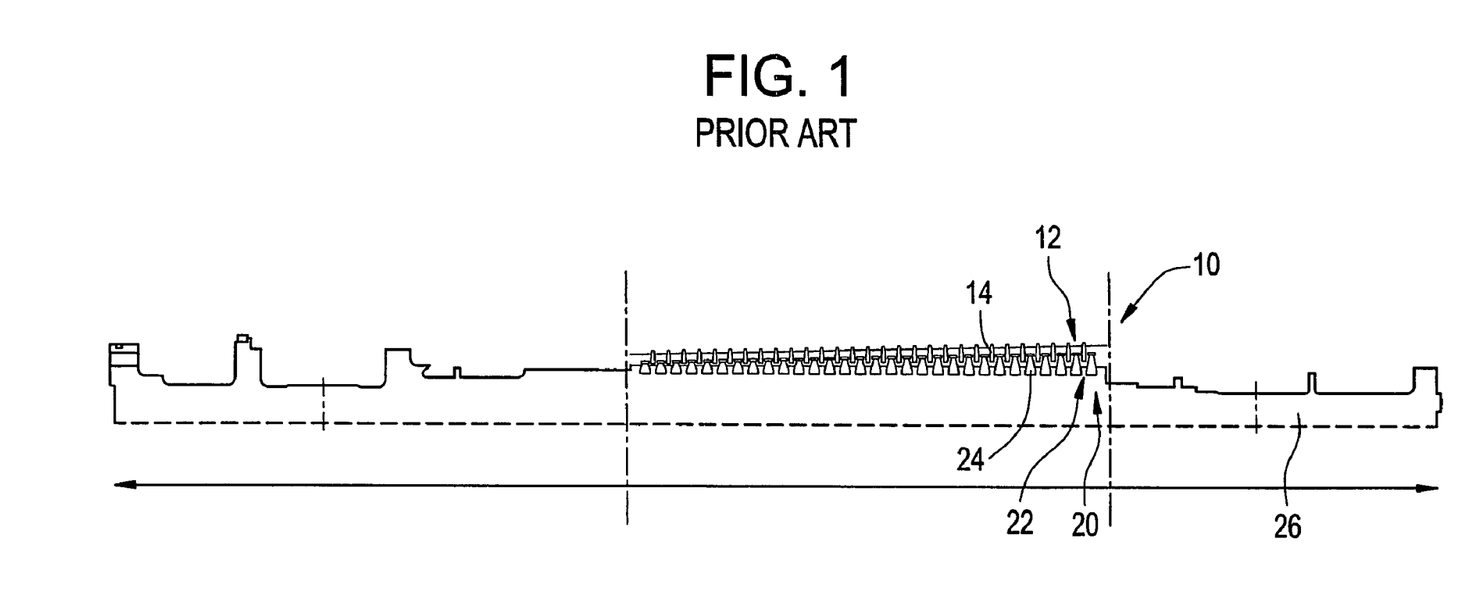
FIG. 1 is a side view of a conventional reaction steam turbine.

FIG. 1 shows a perspective view of a conventional reaction steam turbine. The conventional reaction steam turbine includes a conventional stator 10 having stator stages 12 and a conventional rotor 20 having rotor stages 22. The conventional rotor 20 is disposed proximate to the conventional stator 10 such that each of the stator stages 12 is proximate to a corresponding one of the rotor stages 22. Each of the stator stages 12 includes a plurality of individual airfoils or nozzles 14. Each of the rotor stages 22 includes a plurality of individual airfoils or buckets 24. The nozzles 14 of the stator stages 12 are disposed proximate to the buckets 24 of the corresponding one of the rotor stages 22 to direct flow of a working fluid, for example, steam, toward the buckets 24. The buckets 24 are circumferentially disposed at an outer edge of each of the rotor stages 22. The nozzles 14 are circumferentially disposed at an inner edge of each of the stator stages 12. Both the buckets 24 and the nozzles 14 are fixed at the conventional rotor and stator stages 14 and 12, respectively, for example, by a dovetail assembly. In the dovetail assembly, a dovetail protrusion disposed at a base of each of the buckets 24 and nozzles 14 is disposed into a corresponding groove disposed in the outer edge of each of the rotor stages 22 and the inner edge of each of the stator stages 12. Such a means of attachment the buckets 24 and the nozzles 14 is referred to as a dovetail assembly process.

Referring to FIG. 1, the conventional rotor 20 may include, for example, a forged rotor including a unitary shaft having grooves disposed circumferentially around an external surface of the unitary shaft. Each of the grooves receives a bucket via the dovetail assembly process. Alternatively, the conventional rotor 20 may include, for example, individual wheels corresponding to one of the rotor stages 22, which are disposed proximate to each other and combined together on a shaft 26 to form a conventional rotor 20.

Figure 2:
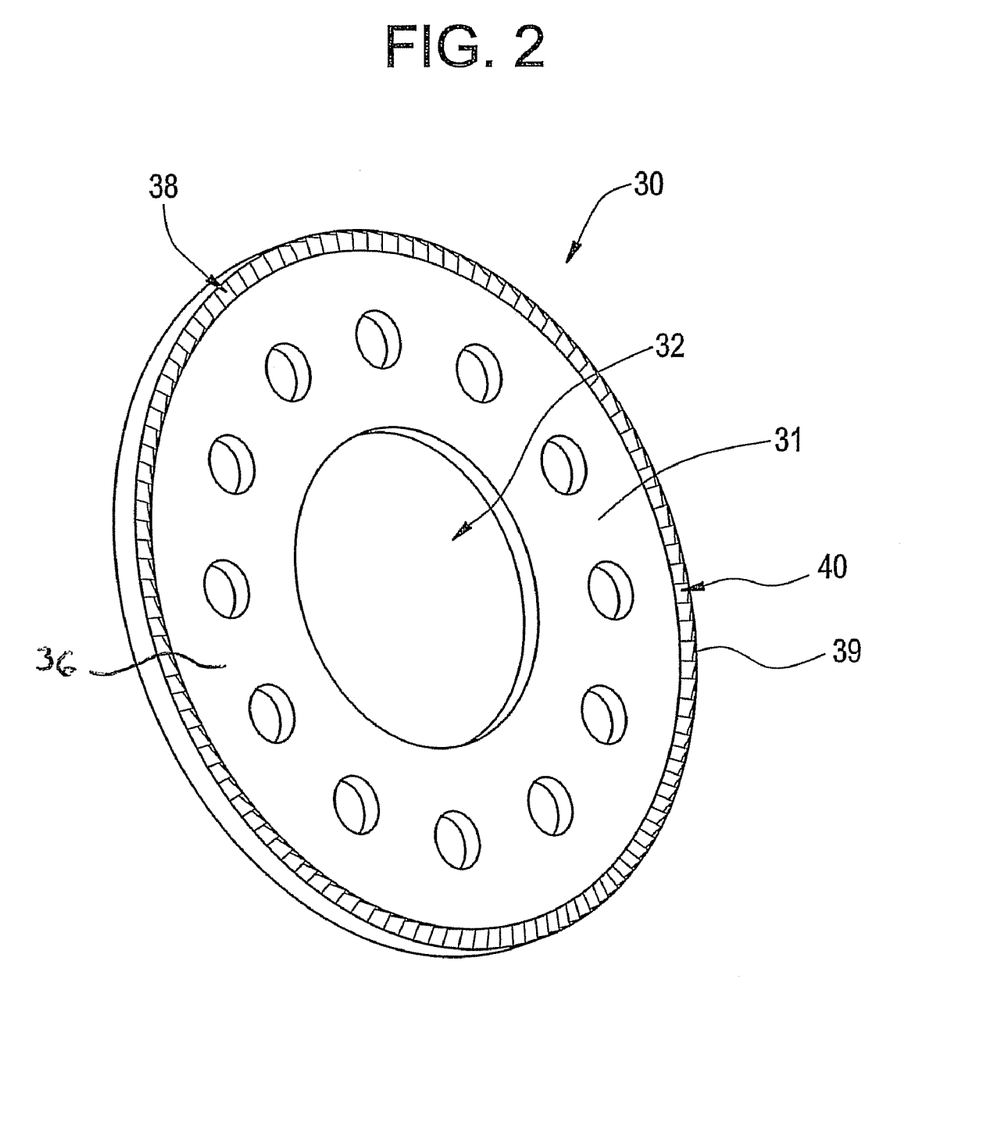
FIG. 2 is a perspective view of a rotor plate according to an exemplary embodiment.

FIG. 2 is a perspective view of a rotor plate 30 according to an exemplary embodiment. The rotor plate 30 corresponds to a single rotor stage. The rotor plate 30 may be shaped as a disk. The rotor plate 30 is comprised of one unitary piece of metal stock. The metal stock is machined to produce mounting features and airfoils. In other words, unlike the rotor stages 22 of the conventional rotor 20, the rotor plate 30 does not have joints between a main body 31 of the rotor plate 30 and the airfoils. Thus, the rotor plate 30 includes jointless attachment between the airfoils and the main body 31 of the rotor plate 30. The mounting features include a center bore 32, retention holes 34 and a fitting portion 36. In an exemplary embodiment, rotor plates 30 may be adjacently disposed to form a rotor assembly, which will be described in greater detail below.

The airfoils include buckets 38 that are circumferentially disposed around a portion of the rotor plate 30 corresponding to an outer edge of the rotor plate 30. The buckets 38 are machined from the metal stock such that the buckets 38 are spaced apart from the edge of the rotor plate 30 and equidistant from an axial center of the rotor plate 30. The buckets 38 are repeatedly formed adjacent to each other to completely extend to form an annular bucket region 40 extending concentrically around the portion of the rotor plate 30 corresponding to the outer edge of the rotor plate 30. Since the buckets 38 are machined from the metal stock, each of the buckets 38 is attached to the main body 31 of the rotor plate 30 without a joining mechanism. Additionally, an outer ring 39 of the metal stock remains after the buckets 38 are machined from the metal stock. The outer ring 39 defines the outer edge of the rotor plate 30. Thus, the buckets 38 are disposed in the annular bucket region 40, which is disposed between the outer ring 39 and the main body 31 of the rotor plate 30.

The center bore 32 is a circular through hole that passes from a first axial face of each rotor plate 30 to a second axial face of the rotor plate 30. The second axial face is opposite to the first axial face. The center bore 32 is concentrically disposed with respect to the rotor plate 30. The center bore 32 of each of the rotor plates 30 is receptive of a shaft of the rotor assembly.

The retention holes 34 are circular through holes that that pass from the first axial face to the second axial face of the rotor plate 30. The retention holes 34 are disposed at the main body 31 of the rotor plate 30. In other words, the retention holes 34 are disposed at a portion of the rotor plate 30 that is between the center bore 32 and the annular bucket region 40. The retention holes 34 are circumferentially disposed at intervals from each other such that the retention holes 34 are each equidistant from the axial center of the rotor plate 30. In an exemplary embodiment, the retention holes 34 are equidistant from each other. The retention holes 34 are receptive of a retention device such as, for example, a holding rod 42 (see FIG. 3), which functions to retain adjacent rotor plates 30 proximate to each other. Additionally, it should be noted that holding rods 42 may be disposed at an exterior of the rotor plate 30.

The fitting portion 36 includes any suitable means to fix adjacent rotor plates 30. In an exemplary embodiment, the fitting portion 36 includes a rabbet fit in which each of the rotor plates 30 includes a protrusion 136 extending into a corresponding recess portion 138 of an adjacent rotor plate 30 (see, for example, FIGS. 12 and 13).

Figure 3:
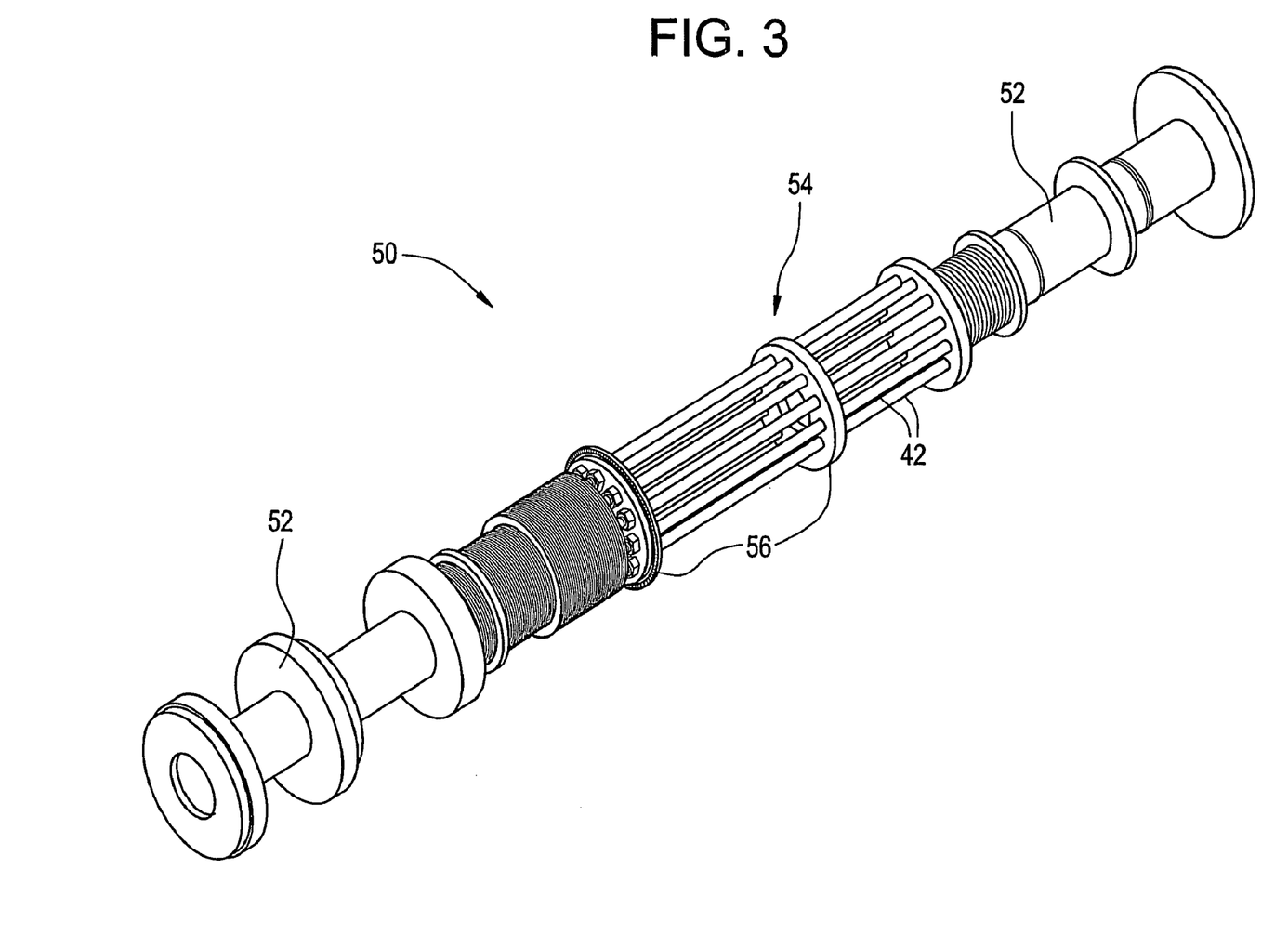
FIG. 3 is a perspective view of a rotor assembly according to an exemplary embodiment.
Figure 4:
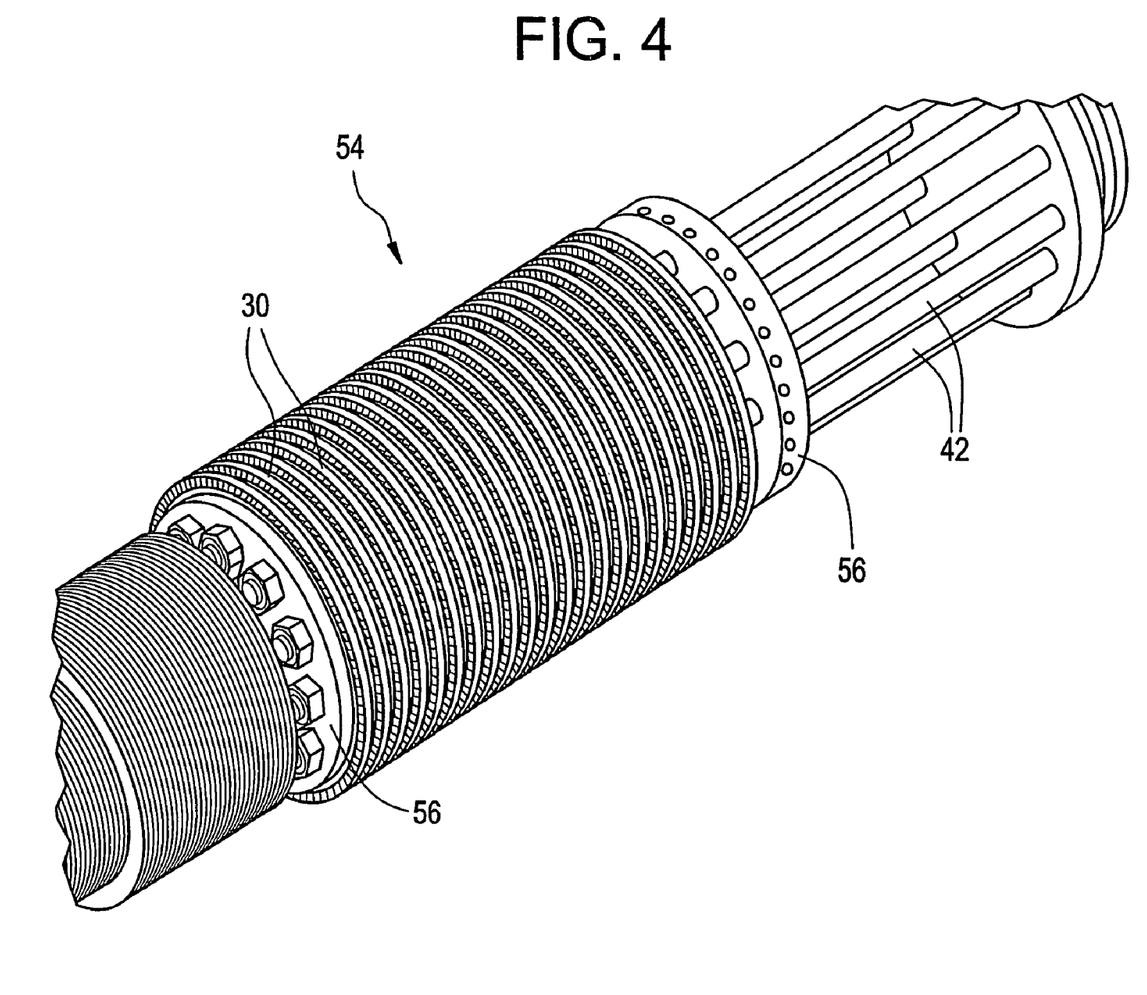
FIG. 4 is a perspective view of a retention portion of the rotor assembly of FIG. 3.

FIG. 3 is a perspective view of a rotor assembly 50 according to an exemplary embodiment. FIG. 4 is a perspective view of a retention portion 54 of the rotor assembly 50 of FIG. 3. The rotor assembly 50 includes shaft ends 52 disposed at opposite ends of the retention portion 54. The retention portion 54 includes end plates 56 and holding rods 42. Although FIGS. 3 and 4 show cylindrically shaped holding rods 42 it should be noted that any suitable shape is envisioned such as, for example, hexagonal or square shaped holding rods 42. Additionally, retention means other than the holding rods 42 are also envisioned. As shown in FIG. 4, the retention portion 54 includes adjacently disposed rotor plates 30 having the holding rods 42 disposed through the retention holes 34 of each of the adjacently disposed rotor plates 30 for retention of the rotor plates 30. Each of the holding rods 42 includes, for example, a nut engaged to a threaded portion of each of the holding rods 42 to permit securing of the rotor plates 30 to the retention portion 54. The shaft ends 52 extend from the opposite sides of the retention portion 54 to allow transmission of rotational energy from the buckets 38 to an external device via rotation of the shaft ends 52.

Figure 5:
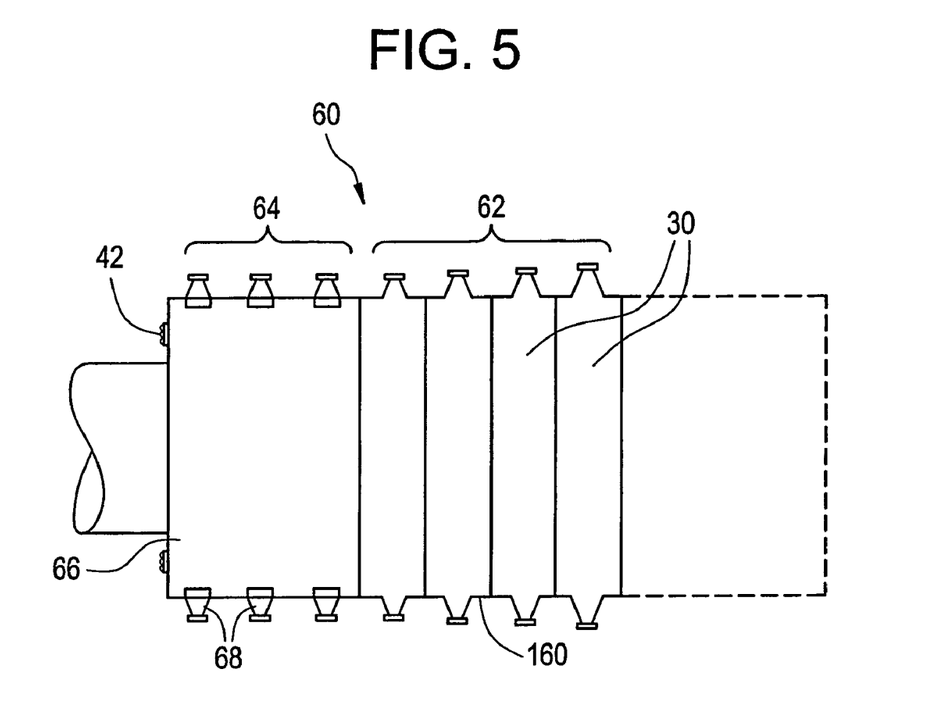
FIG. 5 is a diagram showing a mixed rotor assembly according to an exemplary embodiment.
Figure 6:
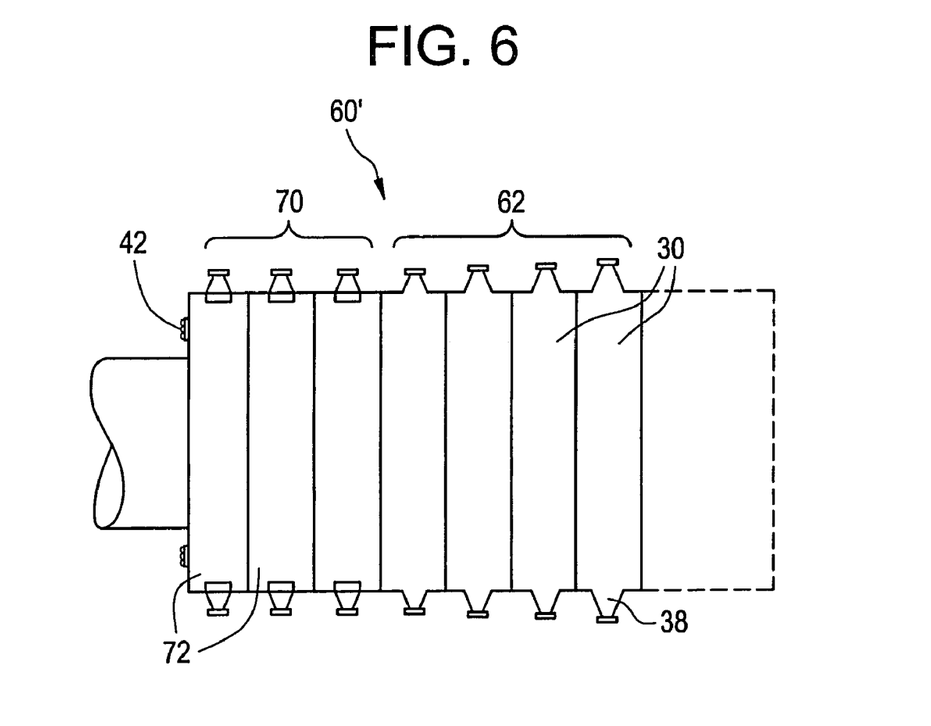
FIG. 6 is a diagram showing a mixed rotor assembly according to another exemplary embodiment.

The rotor assembly 50 shown in FIG. 4 includes rotor plates 30 according to an exemplary embodiment. Alternatively, a mixed rotor may be employed. FIG. 5 is a diagram showing a mixed rotor assembly according to an exemplary embodiment. FIG. 6 is a diagram showing a mixed rotor assembly according to another exemplary embodiment.

Referring to FIG. 5, a mixed rotor 60 includes a stacked rotor section 62 having at least one rotor plate 30 and a forged rotor section 64. The forged rotor section 64 includes a forged rotor portion 66 and forged rotor stages 68 that are fixed onto the forged rotor portion 66 by the dovetail assembly process. Although FIG. 5 shows the forged rotor section 64 being disposed at a rotor end, it should be noted that the forged rotor section 64 and the stacked rotor section 62 may be disposed in any suitable order. Additionally, although FIG. 5 shows three forged rotor stages 68 and four rotor plates 30, it should be noted that a number of the forged rotor stages 68 and a number of the rotor plates 30 may each be varied according to operational and design considerations.

Alternatively, as shown in FIG. 6, a mixed rotor 60' includes the stacked rotor section 62 including at least one rotor plate 30 and a rotor wheel section 70 including at least one rotor wheel 72 in which buckets of the rotor wheel 72 are attached by the dovetail assembly process. Each rotor wheel 72 corresponds to one stage of the mixed rotor 60'. Although FIG. 6 shows the rotor wheel section 70 being disposed at the rotor end, it should be noted that the rotor wheel section 70 and the stacked rotor section 62 may be disposed in any suitable order. Additionally, although FIG. 6 shows three rotor wheels 72 and four rotor plates 30, it should be noted that a number of the rotor wheels 72 and the number of the rotor plates 30 may each be varied according to operational and design considerations. It should also be noted that any combination of sections including the stacked rotor section 62, the rotor wheel section 70 and the forged rotor section 64 is also envisioned.

Figure 7:
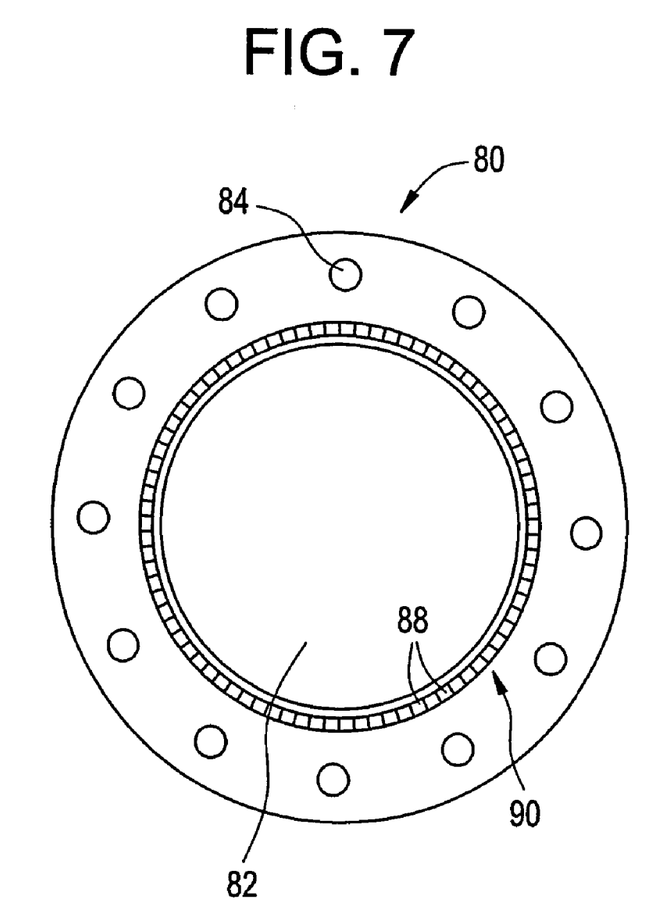
FIG. 7 is a side view of a stator plate according to an exemplary embodiment.
Figure 8:
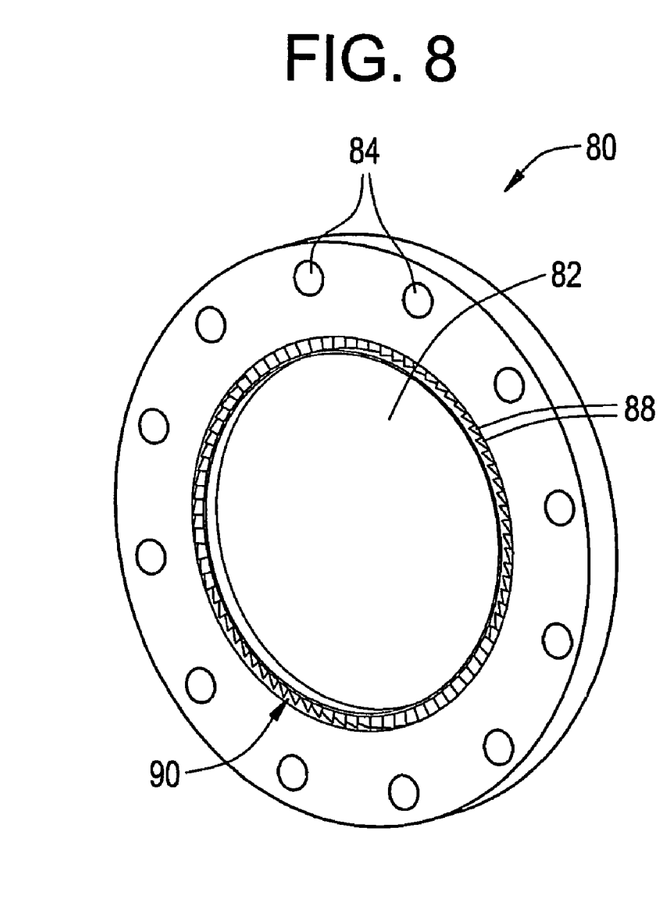
FIG. 8 is a perspective view of the stator plate in FIG. 7.

FIG. 7 is a side view of a stator plate 80 according to an exemplary embodiment. FIG. 8 is a perspective view of the stator plate in FIG. 7. The stator plate 80 corresponds to a single stator stage. The stator plate 80 may be shaped as a disk. The stator plate 80 is comprised of one unitary piece of metal stock. The metal stock is machined to produce mounting features and airfoils. In other words, unlike the stator stages 12 of the conventional stator 10, the stator plate 80 does not have joints between a main body 81 of the stator plate 80 and the airfoils. Thus, the stator plate 80 includes jointless attachment between the airfoils and the main body 81 of the stator plate 80. The mounting features include a central bore 82 and retention holes 84. In an exemplary embodiment stator plates 80 may be adjacently disposed to form a stator assembly, which will be described in greater detail below. Additionally, the stator plates 80 may include a fitting portion similar to the fitting portion 36 described above with reference to FIGS. 2, 12 and 13.

The airfoils include nozzles 88 that are circumferentially disposed around a portion of the rotor plate 30 corresponding to an inner edge of the stator plate 80. The nozzles 88 are machined from the metal stock such that the nozzles 88 are spaced apart from the inner edge of the stator plate 80 and equidistant from an axial center of the stator plate 80. The nozzles 88 are repeatedly formed adjacent to each other to completely extend to form an annular nozzle region 90 extending concentrically around the portion of the stator plate 80 corresponding to the inner edge of the stator plate 80. Since the nozzles 88 are machined from the metal stock, each of the nozzles 88 is attached to the main body 81 of the stator plate 80 without a joining mechanism. Additionally, an inner ring 89 of the metal stock remains after the nozzles 88 are machined from the metal stock. The inner ring 89 defines the inner edge of the stator plate 80. Thus, the nozzles 88 are disposed in the annular nozzle region 90, which is disposed between the inner ring 89 and the main body 81 of the stator plate 80.

The central bore 82 is a circular through hole that passes from a first axial face of each stator plate 80 to a second axial face of the stator plate 80. The second axial face is opposite to the first axial face. The central bore 82 is concentrically disposed with respect to the stator plate 80. The central bore 82 of each of the stator plates 80 is receptive of a shaft of a rotor assembly.

The retention holes 84 are circular through holes that that pass from the first axial face of the stator plate 80 to the second axial face of the stator plate 80. The retention holes 84 are disposed at the main body 81 of the stator plate 80. In other words, the retention holes 84 are disposed at a portion of the stator plate 80 that is between an outer edge of the stator plate 80 and the annular nozzle region 90. The retention holes 84 are circumferentially disposed at intervals from each other such that the retention holes 84 are each equidistant from the axial center of the stator plate 80. The retention holes 84 are receptive of a retention device such as, for example, a holding bolt 92 (see FIG. 9), which functions to retain adjacent stator plates 80 proximate to each other. Additionally, it should be noted that holding bolts 92 may be disposed at an exterior of the stator plate 80.

Figure 9:
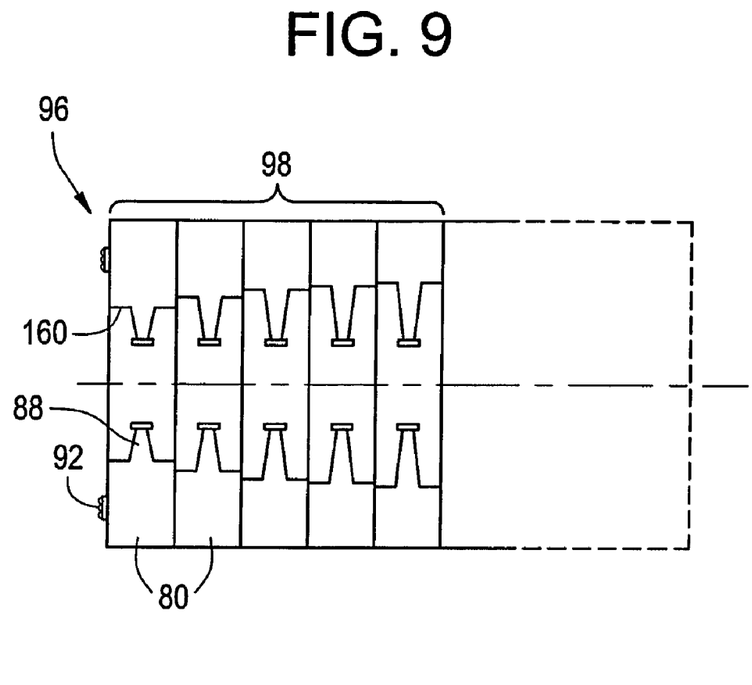
FIG. 9 is a diagram of a stator assembly according to an exemplary embodiment.
Figure 10:
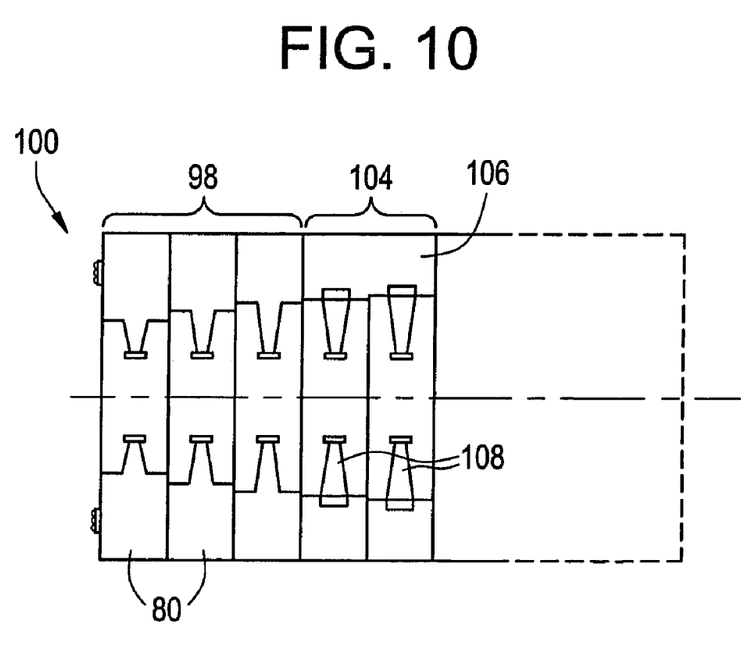
FIG. 10 is a diagram of a stator assembly according to another exemplary embodiment.
Figure 11:
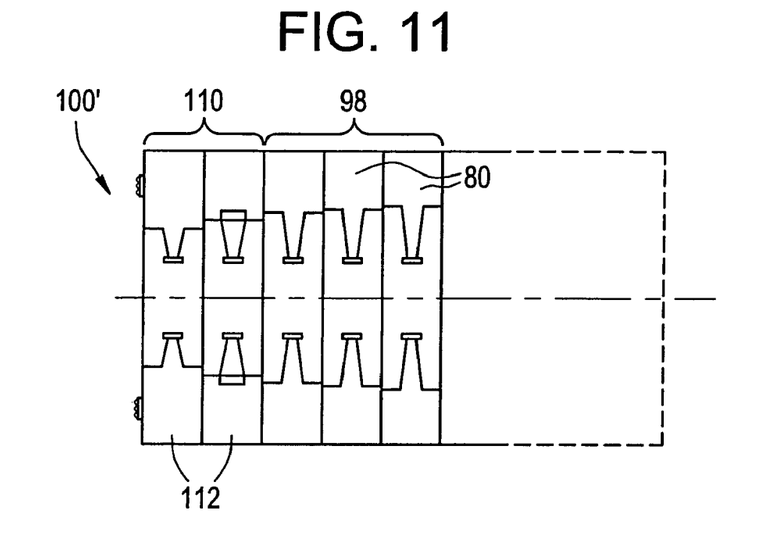
FIG. 11 is a diagram of a stator assembly according to yet another exemplary embodiment.

FIGS. 9-11 are each diagrams of a stator assembly according to an exemplary embodiment. Referring to FIG. 9, a stator assembly 96 includes a stacked stator section 98 having a plurality of stator plates 80. It should be noted that although each of the stator plates 80 is shown having a step configuration with respect to adjacent stator plates 80, a sloped configuration in which each of the stator plates 80 forms a smooth transition with respect to the adjacent stator plates 80 is also envisioned. The stator plates 80 are fixed with respect to each other by the holding bolt 92, which is disposed through the retaining hole 84 of each of the stator plates 80. A nut may be provided to engage a threaded portion of the holding bolt 92 to secure the stator plates 80 together. Although FIG. 9 shows five stator plates 80, either a greater or fewer number of the stator plates 80 may be employed.

Referring to FIG. 10, a mixed stator 100 includes a stacked stator section 98 having at least one stator plate 80 and a cast stator section 104. The cast stator section 104 includes a cast stator portion 106 and cast stator stages 108 that are fixed onto the cast stator portion 106 by the dovetail assembly process. Although FIG. 10 shows the stacked stator section 98 being disposed at a stator end, it should be noted that the stacked stator section 98 and the cast stator section 104 may be disposed in any suitable order. Additionally, although FIG. 10 shows three stator plates 80 of the stacked stator section 98 and two cast stator stages 108 of the cast stator section 104, it should be noted that a number of stages of the cast stator section 104 and a number of the stator plates 80 may each be varied according to operational and design considerations.

Alternatively, as shown in FIG. 11, a mixed stator 100' includes the stacked stator section 98 including at least one stator plate 80 and a stator wheel section 110 including at least one stator wheel 112 in which nozzles of the at least one stator wheel 112 are attached by the dovetail assembly process. Although FIG. 11 shows the stator wheel section 110 being disposed at the stator end, it should be noted that the stator wheel section 110 and the stacked stator section 98 may be disposed in any suitable order. Additionally, although FIG. 11 shows two stator wheels 112 and three stator plates 80, it should be noted that a number of the stator wheels 112 and the number of the stator plates 80 may each be varied according to operational and design considerations. It should also be noted that any combination of sections including the stacked stator section 98, the stator wheel section 110 and the cast stator section 104 is also envisioned.

Additionally, any exemplary embodiment of a rotor design according to FIGS. 2-6 may be incorporated with any exemplary embodiment of a stator design according to FIGS. 7-11. Furthermore, any exemplary embodiment of a rotor design according to FIGS. 2-6 may be incorporated with the conventional stator 10, and any exemplary embodiment of a stator design according to FIGS. 7-11 may be incorporated with the conventional rotor 20.

Figure 12:
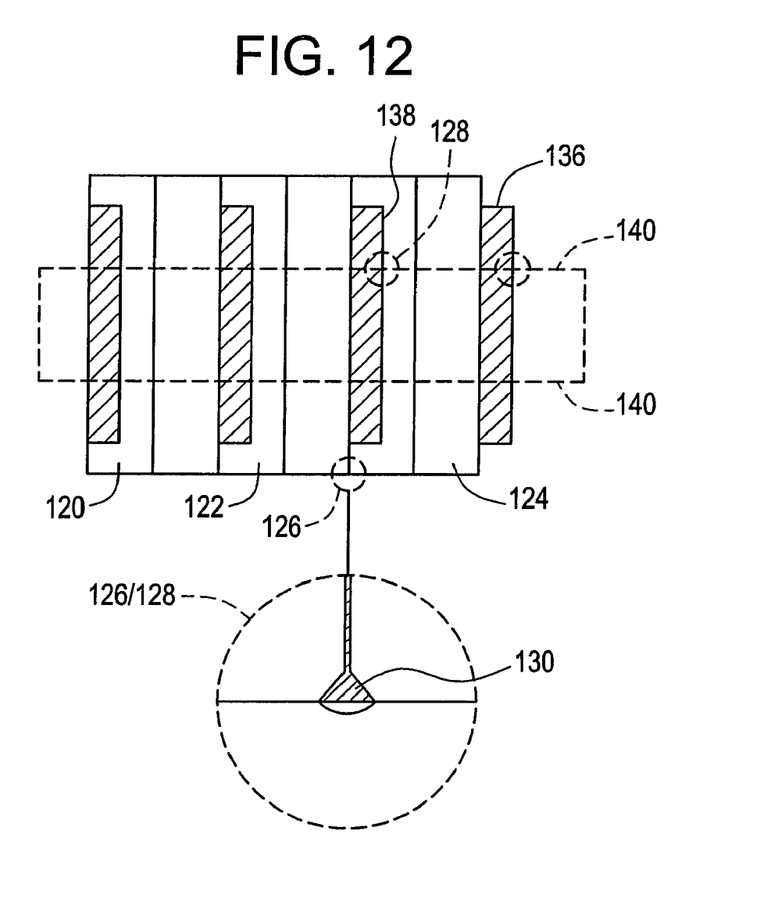
FIG. 12 is a diagram of an axial face seal according to an exemplary embodiment.
Figure 13:
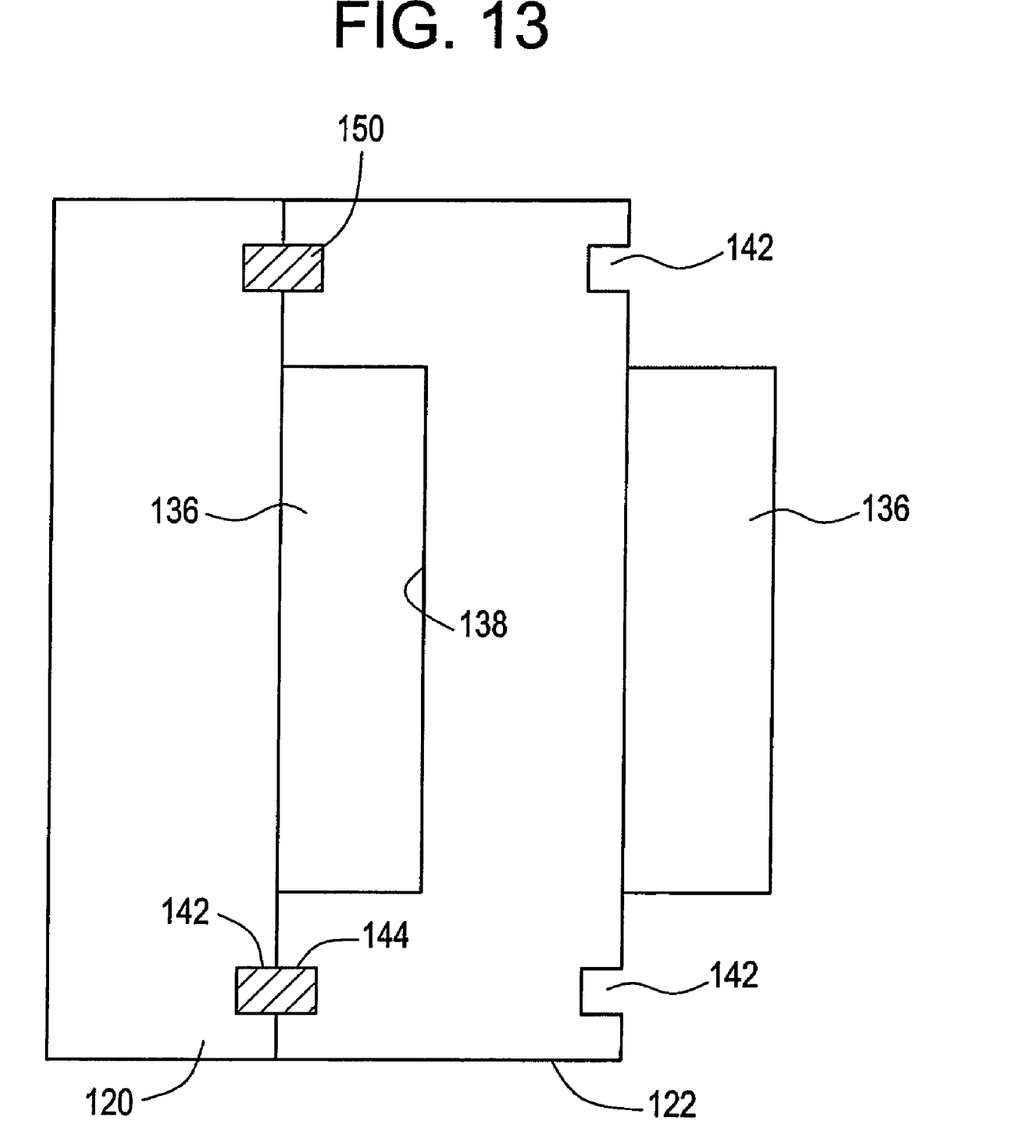
FIG. 13 is a diagram of an axial face seal according to another exemplary embodiment.

In order to prevent an introduction of steam between the rotor plates 30 of the stacked rotor section 62 or between the stator plates 80 of the stacked stator section 98, seals may be installed between adjacent rotor plates 30 or adjacent stator plates 80. FIG. 12 is a diagram of an axial face seal according to an exemplary embodiment. FIG. 13 is a diagram of an axial face seal according to another exemplary embodiment. In both FIGS. 12 and 13 the airfoils (i.e. the buckets 38 or the nozzles 88) are removed for clarity.

Referring to FIG. 12, a first stage 120, a second stage 122 and a third stage 124 are shown. The first, second and third stages 120, 122 and 124 correspond to either three adjacent rotor plates 30 or three adjacent stator plates 80. A circumferential caulk wire seal 130, shown in a blown up region 126/128 of FIG. 12, is disposed between each of the first, second and third stages 120, 122 and 124 at an edge of an airfoil base portion 160 (see FIGS. 5 and 9) of each of the first, second and third stages 120, 122 and 124 that is adjacent to the edge of the airfoil base portion 160 of an adjacent one of the first, second and third stages 120, 122 and 124. If the first, second and third stages 120, 122 and 124 correspond to adjacent rotor plates 30, then the circumferential caulk wire seal 130 is disposed at an intersection of the edges of the airfoil base portions 160 of the adjacent rotor plates 30 as shown by blown up region 126. If the first, second and third stages 120, 122 and 124 correspond to adjacent stator plates 80, then the circumferential caulk wire seal 130 is disposed at an intersection of the edges the airfoil base portions 160 of the adjacent stator plates 80 at a portion shown by blown up region 128. Dotted lines 140 correspond to the edge of the airfoil base portion 160 of the stator plates 80.

The circumferential caulk wire seal 130 is disposed at the intersection of the edges of the airfoil base portions 160 of the adjacent rotor plates 30 or stator plates 80, respectively, after the rotor plates 30 or stator plates 80 have been fixed together by the holding rod 42 or the holding bolt 92, respectively. The circumferential caulk wire seal 130 may be installed using, for example, an A14 or an A15 caulking tool.

As shown in FIG. 12, the first, second and third stages 120, 122 and 124 each include the protrusion 136 disposed at a first axial face of each of the first, second and third stages 120, 122 and 124 and the recess portion 138 disposed at a second axial face of each of first, second and third stages 120, 122 and 124. The protrusion 136 of one of the first, second and third stages 120, 122 and 124 is inserted into the recess portion 138 of an adjacent one of the first, second and third stages 120, 122 and 124 to form the rabbet fit. For example, the protrusion 136 of the first stage 120 is received by the recess portion 138 of the second stage 122 and the protrusion 136 of the second stage 122 is received by the recess portion 138 of the third stage 124.

Referring to FIG. 13, the first and second stages 120 and 122 each include a first annular recess 142 disposed at the first axial face and a second annular recess 144 disposed at the second axial face. The first annular recess 142 of the first axial face of the first stage 120 is disposed to correspond to the second annular recess 144 of the second axial face of the second stage 122. Each of the first and second annular recesses 142 and 144 is annular in shape and concentric with respect to the main body portion 31 of the rotor plate 30 or the main body portion 81 of the stator plate 80. A circular rope seal 150 is disposed in a gap between the first and second stages 120 and 122 formed by the first and second annular recesses 142 and 144. The circular rope seal 150 is installed before the rotor plates 30 or stator plates 80 have been fixed together by the holding rod 42 or the holding bolt 92, respectively. The circular rope seal 150 is compressed within the gap and expands to entirely fill the gap.

It should be noted that the circular rope seal 150 and the circumferential caulk wire 130 may be used individually or in combination for either of a rotor assembly or a stator assembly. Use of the circular rope seal 150 and/or the circumferential caulk wire 130 prevents steam from being exposed to the axial faces of the rotor plates 30 or the stator plates 80, thereby decreasing energy losses in the reaction steam turbine. Furthermore, use of the rotor plates 30 or the stator plates 80 reduces cost and time to manufacture a rotor assembly or a stator assembly.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A rotor assembly for a steam turbine comprising:
a stacked rotor section having rotor plates, each of the rotor plates comprising:
a main body portion having a plate shape and including a first axial face and a second axial face opposite to the first axial face;
an airfoil base surface at an outer radial edge of the main body portion;
buckets extending radially outward from the airfoil base surface; and
at least one retention hole disposed in the rotor plates between a central bore and the buckets;
a seal disposed between adjacent rotor plates to prevent steam exposure to the first and second axial faces; and
at least one retention bolt extending through the at least one retention hole of each rotor plate, the retention bolt capable of retaining adjacent rotor plates proximate with each other.

2. The rotor assembly of claim 1, wherein the seal is disposed at an intersection of adjacent airfoil base surfaces of adjacent rotor plates.

3. The rotor assembly of claim 2, wherein the seal is extended over an entire circumference of the intersection of the adjacent airfoil base surfaces.

4. The rotor assembly of claim 2, wherein the seal comprises a circumferential caulk wire seal.

5. The rotor assembly of claim 1, wherein the main body portion of the rotor plates comprises a first annular recess portion disposed at the first axial face and a second annular recess portion disposed at the second axial face, the first and second annular recess portions being equidistant from an axial center of the main body portion.

6. The rotor assembly of claim 5, wherein the seal is disposed at a gap created between the first annular recess portion of a first rotor plate and the second annular recess portion of a second rotor plate disposed adjacent to the first rotor plate.

7. The rotor assembly of claim 6, wherein the seal is an annular shaped rope seal.

8. A stator assembly for a steam turbine comprising a stacked stator section having stator plates, each of the stator plates comprising:
a main body portion having a plate shape with a hollow center and including a first axial face and a second axial face opposite to the first axial face;
an airfoil base surface near an inner radial edge of the main body portion;
nozzles extending radially inward from the airfoil base surface; and
a seal disposed to prevent steam exposure to the first and second axial faces.

9. The stator assembly of claim 8, wherein the seal is disposed at an intersection of adjacent airfoil base surfaces of adjacent stator plates.

10. The stator assembly of claim 9, wherein the seal is extended over an entire circumference of the intersection of the adjacent airfoil base surfaces.

11. The stator assembly of claim 9, wherein the seal comprises a circumferential caulk wire seal.

12. The stator assembly of claim 8, wherein the main body portion of the stator plates comprises a first annular recess portion disposed at the first axial face and a second annular recess portion disposed at the second axial face, the first and second annular recess portions being equidistant from an axial center of the main body portion.

13. The stator assembly of claim 12, wherein the seal is disposed at a gap created between the first annular recess portion of a first stator plate and the second annular recess portion of a second stator plate disposed adjacent to the first stator plate.

14. The stator assembly of claim 13, wherein the seal is an annular shaped rope seal.

15. A steam turbine comprising:
   a stator assembly including stator plates, the stator plates including:
      a stator main body portion having a plate shape and including a first axial face and a second axial face opposite to the first axial face;
      a stator airfoil base surface near an inner radial edge of the stator main body portion;
      nozzles directing steam flow and extending radially inward from the stator airfoil base surface; and
      a stator plate seal disposed to prevent steam exposure to the first and second axial faces of the stator plates; and
   a rotor assembly including rotor plates, the rotor plates including:
      a rotor main body portion having a plate shape and including a first axial face and a second axial face opposite to the first axial face;
      a rotor airfoil base surface near an outer radial edge of the rotor main body portion;
      buckets receiving the steam flow and extending radially outward from the rotor airfoil base surface; and
      a rotor plate seal disposed to prevent steam exposure to the first and second axial faces of the rotor plates.

16. The steam turbine of claim 15, wherein the stator main body portion comprises a first annular stator recess portion disposed at the first axial face and a second annular stator recess portion disposed at the second axial face of the stator plates, the first and second annular stator recess portions being equidistant from an axial center of the stator main body portion, and the rotor main body portion comprises a first annular rotor recess portion disposed at the first axial face and a second annular rotor recess portion disposed at the second axial face of the rotor plates, the first and second annular rotor recess portions being equidistant from an axial center of the rotor main body portion.

17. The steam turbine of claim 16, wherein the stator plate seal comprises a circular rope seal disposed in a gap between each of the first and second annular stator recess portions of adjacent stator plates.

18. The steam turbine of claim 16, wherein the rotor plate seal comprises a circular rope seal disposed in a gap between each of the first and second annular rotor recess portions of adjacent rotor plates.

19. The steam turbine of claim 15, wherein the rotor seal comprises a circumferential caulk wire disposed at an intersection of adjacent rotor airfoil base surfaces of adjacent rotor plates, the circumferential caulk wire extending over an entire circumference of the intersection of the adjacent rotor airfoil base surfaces.

20. The steam turbine of claim 15, wherein the stator seal comprises a circumferential caulk wire disposed at an intersection of adjacent stator airfoil base surfaces of adjacent stator plates, the circumferential caulk wire extending over an entire circumference of the intersection of the adjacent stator airfoil base surfaces.

* * * * *